(12) United States Patent
Xu et al.

(10) Patent No.: US 10,666,968 B2
(45) Date of Patent: May 26, 2020

(54) METHOD OF BLOCK VECTOR PREDICTION FOR INTRA BLOCK COPY MODE CODING

(71) Applicant: HFI Innovation Inc., Zhubei, Hsinchu County (TW)

(72) Inventors: Xiaozhong Xu, Fremont, CA (US); Shan Liu, San Jose, CA (US); Tzu-Der Chuang, Zhubei (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 379 days.

(21) Appl. No.: 15/307,445

(22) PCT Filed: May 5, 2015

(86) PCT No.: PCT/CN2015/078250
§ 371 (c)(1),
(2) Date: Oct. 28, 2016

(87) PCT Pub. No.: WO2015/169200
PCT Pub. Date: Nov. 12, 2015

(65) Prior Publication Data
US 2017/0054996 A1 Feb. 23, 2017

Related U.S. Application Data

(60) Provisional application No. 62/015,711, filed on Jun. 23, 2014, provisional application No. 61/989,055, filed on May 6, 2014.

(51) Int. Cl.
*H04N 19/52* (2014.01)
*H04N 19/593* (2014.01)
*H04N 19/176* (2014.01)

(52) U.S. Cl.
CPC ........... *H04N 19/52* (2014.11); *H04N 19/593* (2014.11); *H04N 19/176* (2014.11)

(58) Field of Classification Search
CPC ..... H04N 19/176; H04N 19/593; H04N 19/52
(Continued)

(56) References Cited

U.S. PATENT DOCUMENTS

| | | |
|---|---|---|
| 9,363,530 B2 | 6/2016 | Kim et al. |
| 2012/0134416 A1 | 5/2012 | Lin et al. |

(Continued)

FOREIGN PATENT DOCUMENTS

| | | |
|---|---|---|
| CN | 102714720 | 10/2012 |
| CN | 103339941 A | 10/2013 |

(Continued)

OTHER PUBLICATIONS

Xu, X., et al.; "On unification of intra block copy and inter-picture motion compensation;" Joint Collaborative Team on Video Coding (JCT-VC) of ITU-T SG 16 WP 3 and ISO/IEC JCT 1/SC 29/WG 11; Jan. 2014; pp. 1-16.

(Continued)

*Primary Examiner* — On S Mung
(74) *Attorney, Agent, or Firm* — Oblon, McClelland, Maier & Neustadt, L.L.P.

(57) ABSTRACT

A method of block vector (BV) prediction for an IntraBC mode (Intra-block copy mode) coded block in a video coding system according to the present invention is disclosed. Multiple BV candidate lists are derived from neighboring blocks of the current block. A BV candidate list is selected as a BV predictor for the BV of the current block. The current block is coded based on an Intra reference block located according to the BV of the current block. In one embodiment, a left-bottom (LB) block of the current block is used to derive the first BV candidate list and an above- (Continued)

right (AR) block of the current block is used to derive the second BV candidate list. A 1-bit index code is signaled to select a BV predictor between the first BV candidate list and the second BV candidate list.

20 Claims, 4 Drawing Sheets

(58) Field of Classification Search
USPC .................................. 375/240.12, 240.16
See application file for complete search history.

(56) References Cited

U.S. PATENT DOCUMENTS

| | | | |
|---|---|---|---|
| 2012/0307905 A1* | 12/2012 | Kim ................ | H04N 19/52 375/240.16 |
| 2012/0320969 A1 | 12/2012 | Zheng et al. | |
| 2014/0079131 A1 | 3/2014 | Sugio et al. | |
| 2014/0105302 A1* | 4/2014 | Takehara .......... | H04N 19/105 375/240.15 |
| 2015/0063440 A1* | 3/2015 | Pang ................ | H04N 19/174 375/240.02 |
| 2015/0139329 A1 | 5/2015 | Nakamura et al. | |
| 2016/0050412 A1 | 2/2016 | Takehara et al. | |
| 2016/0269741 A1 | 9/2016 | Kim et al. | |
| 2017/0318312 A1 | 11/2017 | Segall | |

FOREIGN PATENT DOCUMENTS

| | | |
|---|---|---|
| CN | 103563386 | 2/2014 |
| CN | 103609121 | 2/2014 |
| CN | 104094604 A | 10/2014 |
| JP | 2013-74468 A | 4/2013 |
| JP | 2013-138504 A | 7/2013 |
| JP | 2014-017854 A | 1/2014 |
| JP | 2014-509093 A | 4/2014 |
| KR | 2000-0021856 A | 4/2000 |
| KR | 2011-0054592 A | 5/2011 |
| KR | 2014-0008503 A | 1/2014 |
| WO | WO 2012/120870 | 9/2012 |
| WO | WO 2013/108616 A1 | 7/2013 |
| WO | WO 2013/159038 | 10/2013 |

OTHER PUBLICATIONS

Kim, I.K., et al.; "High Efficiency Video Coding (HEVC) Test Model 14 (HM14) Encoder Description;" Joint Collaborative Team on Video Coding (JCT-VC) of ITU-T SG 16 WP 3 and ISO/IEC JCT 1/SC 29/WG 11; Jan. 2014; pp. 1-9.
Pang, C., et al.; "Block vector prediction method for Intra block copy;" Joint Collaborative Team on Video Coding (JCT-VC) of ITU-T SG 16 WP 3 and ISO/IEC JCT 1/SC 29/WG 11; Mar.-Apr. 2014; pp. 1-3.
Zhu, L., et al.; "Ping-Pong block vector predictor for intra block copy;" Joint Collaborative Team on Video Coding (JCT-VC) of ITU-T SG 16 WP 3 and ISO/IEC JCT 1/SC 29/WG 11; Mar.-Apr. 2014; pp. 1-12.
International Search Report dated Jun. 19, 2015, issued in application No. PCT/CN2015/078250.
Rosewarne, C., et al.; "HEVC Range Extensions Test Model 6 Encoder Description;" Joint Collaborative Team on Video Coding (JCT-VC) of ITU-T SG16 WP3 and ISO/IEC JTC1/SC29/WG11; Jan. 2014; pp. 1-20.
Zhu, L., et al.; "Initialization of block vector predictor for intra block copy;" Joint Collaborative Team on Video Coding (JCT-VC) of ITU-T SG16 WP3 and ISO/IEC JTC1/SC29/WG11; Jan. 2014; pp. 1-6.
Xu, X., et al.; "SCCE1 Test 3.4-IntraBC BV prediction;" Joint Collaborative Team on Video Coding (JCT-VC) of ITU-T SG16 WP3 and ISO/IEC JTC1/SC29/WG11; Jul. 2014; pp. 1-4.
Kim, I.K., et al.; "High Efficiency Video Coding (HEVC) Test Model 13;" Joint Collaborative Team on Video Coding (JCT-VC) of ITU-T SG16 WP3 and ISO/IEC JTC1/SC29/WG11; Oct.-Nov. 2013; pp. 1-36.

\* cited by examiner

Fig. 3

METHOD OF BLOCK VECTOR PREDICTION FOR INTRA BLOCK COPY MODE CODING

CROSS REFERENCE TO RELATED APPLICATIONS

The present invention claims priority to U.S. Provisional Patent Application, Ser. No. 61/989,055, filed on May 6, 2014 and U.S. Provisional Patent Application, Ser. No. 62/015,711, filed on Jun. 23, 2014. The U.S. Provisional Patent Applications are hereby incorporated by reference in their entireties.

TECHNICAL FIELD

The present invention relates to video coding using Intra-block copy (IntraBC) mode. In particular, the present invention relates to techniques to improve the performance of the Intra-block copy (IntraBC) coding mode for screen content coding or video coding.

BACKGROUND

In the current development of range extension (RExt) or screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC Range Extension and screen content coding, a new Intra coding mode, named Intra-block copy (IntraBC) has been used. The IntraBC technique that was originally proposed by Budagavi in *AHG8: Video coding using Infra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

In JCTVC-M0350, the Intra MC is different from the motion compensation used for Inter prediction in at least the following areas:

MVs are restricted to be 1-D for Intra MC (i.e., either horizontal or vertical) while Inter prediction uses 2-D motion estimation.

Binarization is fixed length for Intra MC while Inter prediction uses exponential-Golomb.

Intra MC introduces a new syntax element to signal whether the MV is horizontal or vertical.

Based on JCTVC-M0350, some modifications are disclosed by Pang, et al. in *Non-RCE3: Infra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two MV coding methods were disclosed:

Method 1-Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.

Method 2: No Motion vector prediction. The MV is coded using the exponential-Golomb codes that are used for MVD in HEVC.

Another difference disclosed in JCTVC-N0256 is that the 2-D Intra MC is further combined with the pipeline friendly approach:

1. No interpolation filters are used,
2. MV search area is restricted. Two cases are disclosed:
   a. Search area is the current CTU and the left CTU or
   b. Search area is the current CTU and the rightmost 4 column samples of the left CTU.

Among the proposed methods in JCTVC-N0256, the 2-D Intra MC, the removal of interpolation filters, and the search area constraint to the current CTU and the left CTU have been adopted in a new version draft standard.

In the IntraBC mode coding, for each IntraBC mode coded block, a block vector (BV) has to be signaled and the amount of data associated with BV signaling may be substantial. It is desirable to develop efficient coding method for the BVs.

SUMMARY

A method of block vector (BV) prediction for an IntraBC mode (Intra-block copy mode) coded block in a video coding system according to the present invention is disclosed. Multiple BV candidate lists are derived from neighboring blocks of the current block. A BV candidate list is selected as a BV predictor for the BV of the current block. The current block is coded based on an Intra reference block located according to the BV of the current block.

In one embodiment, the multiple BV candidate lists correspond to a first BV candidate list and a second BV candidate list. The first BV candidate list is generated from one or more first neighboring blocks in selected first positions according to a first position-related priority order, and the second BV candidate list is generated from one or more second neighboring blocks in selected second positions according to a second position-related priority order. The first BV candidate list is filled by the BV from a first available first neighboring block coded using the IntraBC mode, and the second BV candidate list is filled by the BV of a first available second neighboring block coded using the IntraBC mode. For example, the first neighboring blocks may correspond to a single first spatial neighboring block at a left-bottom (LB) position of the current block and the second neighboring blocks may correspond to a single second spatial neighboring block at an above-right (AR) position. In the case of two BV candidate lists, the index corresponds to a 1-bit code to select between the first BV candidate list and the second BV candidate list.

When the first BV candidate list is generated before the second BV candidate list is generated, and the second neighboring blocks in the selected second positions are used to fill the first BV candidate list if the first BV candidate list cannot be filled from the first neighboring blocks in the selected first positions. If no available BV candidate can be found for the first BV candidate list from the first neighboring blocks in the selected first positions or both the first neighboring blocks in the selected first positions and the second neighboring blocks in the selected second positions, then a default BV is used for the first BV candidate list. Furthermore, if no available BV candidate can be found for the second BV candidate list from the second neighboring blocks in the selected second positions, a default BV is used for the second BV candidate list.

Each BV candidate list is generated from neighboring blocks in selected positions according to a position-related priority order. If no neighboring block in selected positions associated with a BV candidate list is available to fill the BV candidate list, a default BV can be used for the BV candidate list. For example, the default BV can be selected from a group including (0, 0), (−2w, 0), (−w, 0), (0, −2w) and (0, −w), wherein w corresponds to block width.

In another embodiment, if no neighboring block in selected positions associated with a BV candidate list is available to fill the BV candidate list, a substitute BV corresponding to a previously IntraBC mode coded block can be used for the BV candidate list. If two BV candidate lists are used, two buffers can be used to store the substitute BVs corresponding to previously IntraBC mode coded blocks. The BVs stored in the two buffers are different. The two buffers can be initialized using two initial BV values corresponding to (−2w, 0) and (−w, 0), wherein w corresponds to block width. The multiple BV candidate lists may correspond to one BV candidate list, and one buffer is used to store the substitute BVs corresponding to previously IntraBC mode coded blocks.

The BV candidate lists may include a temporal BV candidate list derived from one or more temporal neighboring blocks of the current block. The temporal neighboring blocks may correspond to one or more co-located blocks selected from a group including a center (CTR) block, an outer bottom-right (BR) block, an upper-left (UL) block and an inner bottom-right (BR2) block in a co-located picture of the current picture. Furthermore, the BV candidate lists may include two or more BV candidate lists selected from a group consisting of one or more spatial BV candidate lists, one or more temporal BV candidate lists, and one or more stored BV candidate lists corresponding to one or more previously coded BVs. A BV predictor (BVP) list can be constructed to derive the BV candidate lists by adding one or more new BV candidate list to a previous BVP list. The BVP list can be pruned to remove any redundant BV candidate list before or after adding one or more new BV candidate list to the previous BVP list. If the size of the final BVP list is greater than N, only N BV candidate lists of the final BVP list are used, wherein N is an integer greater than one. If the size of the final BVP list is less than N, one or more pre-defined BVs are added to the final BVP list. The pre-defined BVs may correspond to one or more pre-defined values selected from a group including (0, 0), (−2w, 0), (−w, 0), (−1.5w, 0), (0, −2w), (0, −w) and (0, −1.5w), wherein w corresponds to block width.

BRIEF DESCRIPTION OF THE DRAWINGS

FIG. 3 illustrates an example of neighboring blocks according to an embodiment of the present invention for deriving block vector (BV) candidate lists.

DETAILED DESCRIPTION

In order to improve the performance of block vector (BV) coding for blocks coded using the Intra-block copy (IntraBC) mode, the present invention discloses the use of multiple BV candidate lists for BV prediction.

Figure 1:
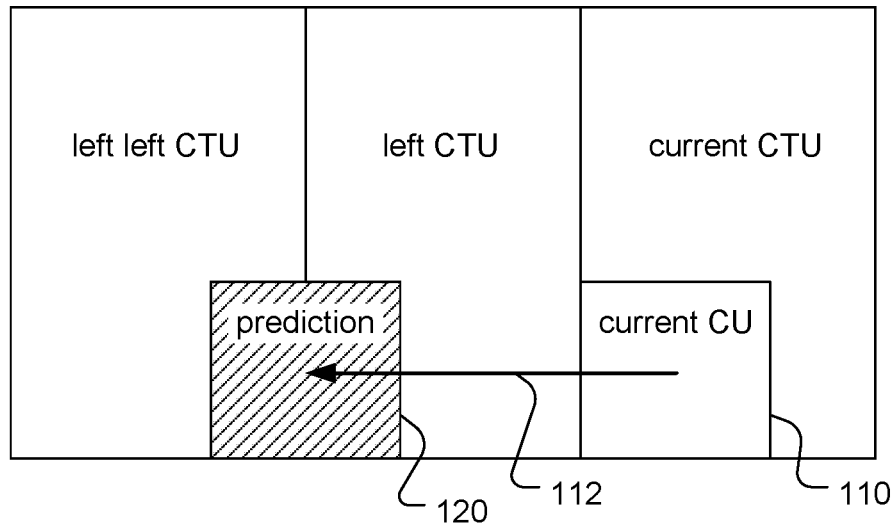
FIG. 1 illustrates an example of Intra motion compensation according to the Intra-block copy (IntraBC) mode, where a horizontal displacement vector is used.
Figure 2:
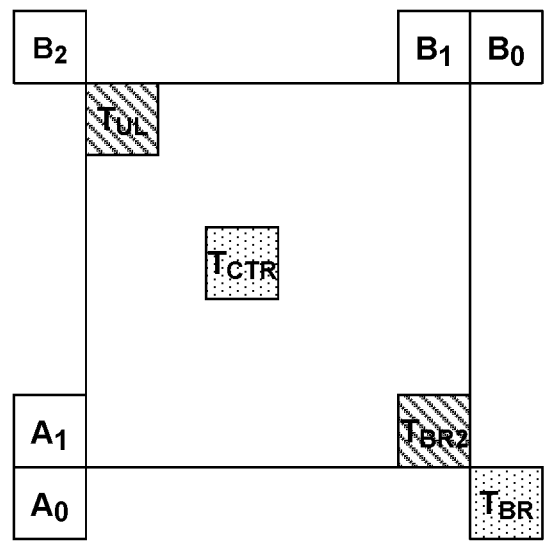
FIG. 2 illustrates the motion vector prediction (MVP) candidate set being used for advanced MVP in high efficiency video coding (HEVC).

In a co-pending PCT Application, Serial No. PCT/CN2015/073225, a method of block vector prediction for the BV coded in the IntraBC mode using AMVP (advanced motion vector prediction) has been disclosed, where block vectors associated with neighboring blocks are used as block vector prediction candidates for the current block vector. In HEVC, in addition to the spatial AMVP (advanced motion vector predictor), temporal MV predictor is also used for inter-slice motion compensation. As shown in FIG. 2, a temporal predictor is derived from a block ($T_{BR}$ or $T_{CTR}$) located in a co-located picture where the co-located picture is the first reference picture in reference list 0 or reference list 1. In FIG. 2, besides the center ($T_{CTR}$) and the outer bottom-right ($T_{BR}$) co-located blocks, other co-located blocks, such as the upper-left ($T_{UL}$) and inner bottom-right ($T_{BR2}$) co-located blocks may also be used. Since the temporal MVP associated with a block may have two MVs: one MV from reference list 0 and one MV from reference list 1, the temporal MVP is derived from the MV from reference list 0 or reference list 1 according to the following rule:
1. The MV that crosses the current picture is chosen first.
2. If both MVs cross the current picture or both do not cross, the one with same reference list as the current list will be chosen.

Figure 3:
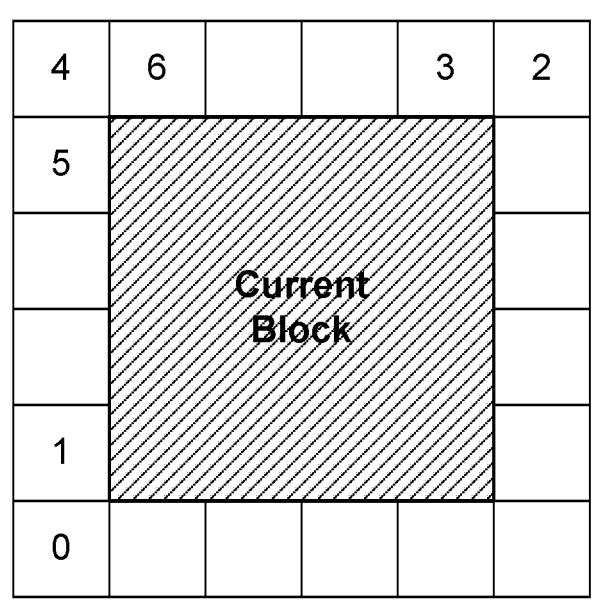

In the co-pending PCT Application, Serial No. PCT/CN2015/073225, exemplary block vector prediction candidates are shown in FIG. 3, where a number of possible block vector candidates in previously coded neighboring block positions are shown. In Table 1, these positions are described in details.

TABLE 1

| Position | Description |
| --- | --- |
| 0-LL | Lower-left position of the current block |
| 1-LB | Left-bottom position of the current block |

TABLE 1-continued

| Position | Description |
| --- | --- |
| 2-UR | Upper-right position of the current block |
| 3-AR | Above-right position of the current block |
| 4-UL | Upper-left position of the current block |
| 5-LT | Left-top position of the current block |
| 6-AL | Above-left position of the current block |

In the co-pending PCT Application, Serial No. PCT/CN2015/073225, two candidate lists are constructed, named List 0 and List 1. For List 0, position 0 is checked first. If the block in this position is IntraBC coded, then its block vector is selected to fill List 0. Otherwise, position 1 will be checked. If the block in this position is IntraBC coded, then its block vector is selected to fill List 0.

If none of the above two positions are IntraBC coded, positions 2, 3, 4 will be checked one by one. The BV of first IntraBC coded block will be filled in List 0. If List 0 has been filled by either position 0 or 1, positions 2, 3, 4 will be checked one by one, the BV of first IntraBC coded block will be filled in List 1.

In case there are not enough IntraBC coded blocks in the neighboring positions, after checking the above-mentioned 5 positions, a default vector will be used to fill the unfilled list(s).

For each IntraBC coded block, there are two BV prediction candidates from the above two lists (List 0 and List 1). A flag is used to indicate which of the two BV predictors is actually used for the prediction of the BV in the current block. Then the BV prediction difference is further entropy coded.

In the following, the BV of one block is considered "available" if the block exists and it is coded in a certain mode, such as IntraBC mode. A list is denoted as "empty" if none of the candidate BV(s) for this list is available. The present invention is intended to further improve block vector prediction and various embodiments are disclosed as follows.

Embodiment 1. BV Prediction Using
Position-Related Priority Order: 1→; 3→2→4

In FIG. 3, positions will be checked in the order of 1 (LB) and 0 (LL) one by one and the first available BV is used to fill List 0. Positions are checked in the order of 3 (AR), 2 (UR) and 4 (UL) one by one to fill List 0 (if List 0 has not been filled yet) or List 1 (if List 0 has been filled). For the empty list(s) after checking all the positions, default block vector(s) can be used to fill the list(s).

As shown above, the neighboring blocks in selected positions are searched according to a position-related priority order. For example, the selected positions for deriving List 0 correspond to positions 1 (LB) and 0 (LL). Position 1 (LB) has a higher priority than position 0 (LL) in this example. On the other hand, the selected positions for deriving List 0 or List 1 correspond to positions 3 (AR), 2 (UR) and 4 (UL). Position 3 (AR) has a higher priority than position 2 (UR), and position 2 (UR) has a higher priority than position 4 (UL) in this example.

Embodiment 2. BV Prediction Using
Position-Related Priority Order: 1→0; 3→2

In FIG. 3, positions will be checked in the order of 1 (LB) and 0 (LL) one by one and the first available BV is used to fill List 0. Positions will be checked in the order of 3 (AR) and 2 (UR) one by one to fill List 0 (if List 0 has not been filled yet) or List 1 (if List 0 has been filled). For the empty list(s) after checking all the positions, default vector(s) can be used to fill the list(s).

Embodiment 3. BV Prediction Using
Position-Related Priority Order: 1; 3→4

In FIG. 3, position 1 (LB) will be checked to fill List 0. Positions will be checked in the order of 3 (AR) and 4 (UL) one by one to fill List 0 (if List 0 has not been filled yet) or List 1 (if List 0 has been filled). For the empty list(s) after checking all the positions, default vector(s) can be used to fill the list(s).

Embodiment 4. BV Prediction Using
Position-Related Priority Order: 1; 3

In FIG. 3, position 1 (LB) will be checked to fill List 0. Position 3 (AR) will be checked to fill List 0 (if List 0 has not been filled yet) or List 1 (if List 0 has been filled). For the empty list(s) after checking all the positions, default vector(s) can be used to fill the list(s).

Embodiment 5. BV Prediction Using
Position-Related Priority Order: 1→5; 3→6

In FIG. 3, positions will be checked in the order of 1 (LB) and 5 (LT) one by one and the first available BV is used to fill List 0. Positions will be checked in the order of 3 (AR) and 6 (AL) one by one to fill List 0 (if List 0 has not been filled yet) or List 1 (if List 0 has been filled). For the empty list(s) after checking all the positions, default vector(s) can be used to fill the list(s).

Embodiment 6. BV Prediction Using
Position-Related Priority Order: 1→5; 3→6→4

In FIG. 3, positions will be checked in the order of 1 (LB) and 5 (LT) one by one and the first available BV is used to fill List 0. Positions will be checked in the order of 3 (AR), 6 (AL) and 4 (UL) one by one to fill List 0 (if List 0 has not been filled yet) or List 1 (if List 0 has been filled). For the empty list(s) after checking all the positions, default vector(s) can be used to fill the list(s).

Embodiment 7. BV Prediction Using
Position-Related Priority Order: 5→1; 6→3

In FIG. 3, positions will be checked in the order of 5 (LT) and 1 (LB) one by one and the first available BV is used to fill List 0. Positions will be checked in the order of 6 (AL) and 3 (AR) one by one to fill List 0 (if List 0 has not been filled yet) or List 1 (if List 0 has been filled). For the empty list(s) after checking all the positions, default vector(s) can be used to fill the list(s).

Embodiment 8. BV Prediction Using
Position-Related Priority Order: 5; 6

In FIG. 3, position 5 (LT) will be checked to fill List 0. Position 6 (AL) will be checked to fill List 0 (if List 0 has not been filled yet) or List 1 (if List 0 has been filled). For the empty list(s) after checking all the positions, default vector(s) can be used to fill the list(s).

Embodiment 9. BV Prediction Using Different List Construction

All the above mentioned candidate position selections disclosed in Embodiment 1 to Embodiment 8 follow the rule that if the first set of candidate BV(s) are not available, List 0 is empty. The second set of candidate BV(s) are then used to fill List 0. Therefore, in this case List 1 will become empty. All the above mentioned methods may have different list construction options. For example, in Embodiment 1, if none of the positions in the first set (positions 1 and 0) are available, List 0 can be filled with a default BV and the first available BV from positions 3, 2 and 4 is always used to fill List 1. When none of BVs in these three positions are available, List 1 can be filled with a default By.

Embodiment 10. BV Prediction Using Default Block Vectors

Default BV values are used in case one or two of the lists are empty. The default BV value for filling List 1 may be the same as or different from the default BV value for List 0. The default value may correspond to (0, 0), (−2w, 0), (−w, 0), (0, −2w) or (0, −w). For example, if only one list is empty, then (−2w, 0) can be used. If both lists are empty, (−2w, 0) and (−w, 0) can be used to fill the two lists. Here and throughout the invention, "w" refer to the width of the current block (i.e., the current CU).

Embodiment 11. BV Prediction Using Stored Block Vectors

Another way to fill the empty list(s) is to store the BV(s) of previously coded block(s). When one or two of the lists are empty, the stored vector(s) can be used to fill the list(s).

For example, two buffers (Unit 0 and Unit 1) can be used to store recently coded BVs with different values. For initialization, some default values are used to fill these two units. For example, (−2w, 0) and (−w, 0) can be used as the initial values for these two buffers. When a block is coded in the same mode and its BV value is different from either of the two units, the value in Unit 1 will fill the Unit 0 and the current new BV value will fill Unit 1.

Embodiment 12. Vector Prediction Using Temporal BV

For IntraBC BV prediction, the temporal BV can also be used for the BV prediction. The BV of a block (e.g., $T_{BR}$, $T_{CTR}$, $T_{UL}$ or $T_{BR2}$ in FIG. 2) located in a co-located picture as mentioned before can be used as one of the BV predictor.

Embodiment 13. BV Prediction Using Both Spatial/Temporal BV and Stored Vectors The BV(s) of previously coded block(s) can be stored and used as the BV predictor(s). If multiple stored BVs are used, a FIFO mechanism can be applied. For example, two units (Unit 0 and Unit 1) are used to store recently coded BVs with different values. For initialization, some default values are used to fill these two units. For example, (−2w, 0) and (−w, 0). When a block is coded in the same mode and its BV value is different from either of the two units, the value in Unit 1 will fill the Unit 0; the current new BV value will fill Unit 1.

A BV predictor (BVP) list can be constructed. The spatial BVs from List 0 and List 1, temporal BV, stored BVs can be put into the BVP list. For example, the BVP list can be {spatial BV from List 0 (List 0 BV), spatial BV from List 1 (List 1 BV)}, {List 0 BV, List 1 BV, temporal BV}, {List 0 BV, List 1 BV, BV stored in Unit 0 (stored BV 0)}, {List 0 BV, List 1 BV, stored BV 0, BV stored in Unit 1 (stored BV 1)}, {List 0 BV, stored BV 0, List 1 BV}, {stored BV 0, List 0 BV, List 1 BV}, {List 0 BV, List 1 BV, temporal BV, stored BV 0}, or {List 0 BV, List 1 BV, stored BV 0, temporal BV}.

After the BVP list is constructed, the pruning process can be applied to remove the redundant BV. It can be full pruning or partial pruning (e.g. only pruning the List 0 BV with stored BV and/or pruning the List 1 BV with stored BV). After pruning, at most N (e.g. N=2) BVs selected as final BV predictor. If less than N BVs can be selected, the predefined default BVs, stored BV, or temporal BV can be used to fill the BVP list to N BV predictors.

Some of the predefined BV can be used. The predefined BV can be selected from a group including (0, 0), (−2w, 0), (−w, 0), (−1.5w, 0), (0, −2w), (0, −w) and (0, −1.5w).

Information Inheritance for MV, BV, and Intra Prediction Mode

In Intra mode and IntraBC mode coded block, the MVs are set as unavailable. In Inter mode and Intra mode coded block, the BVs are set as unavailable. In Inter mode and IntraBC mode coded block, the Intra prediction mode (IPM) are set as unavailable.

In order to improve the coding efficiency, inheritance of the MV/BV/IPM information from the neighboring block or coded block is used if the information is not updated.

In one embodiment, if the current block is coded in Inter mode, Intra mode, or palette mode, the BV of this block is set to the last coded BV or the BV of its left block.

In another embodiment, if the current block is coded in IntraBC mode or palette mode, the MV of this block is set to the one of the merging candidate of this block, such as the first merging candidate.

In yet another embodiment, if the current block is coded in Inter mode or palette mode, the IPM of this block is set to the one of the most probable Intra mode (MPM) of this block, such as the first MPM.

The performance for a system incorporating embodiments of the present invention is compared to an anchor system based on SCM 1.0 (Screen content coding test model 1 (SCM 1), Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, Document: JCTVC-Q1014). In the anchor system based on SCM 1.0, the BV for each IntraBC mode coded block is coded without using BV prediction. Three different system configurations are used to compare with SCM 1.0 under all-Intra mode setting for various test images as shown in Table 2. In configuration I, List 0 derivation uses position 1 (LB) only and List 1 derivation uses position 3 (AR) only. In configuration II, other than List 0 based on 1 (LB) and List 1 based on 3 (AR), one last BV (i.e., the BV of a last IntraBC mode coded block) is used. In configuration III, other than List 0 based on 1 (LB) and List 1 based on 3 (AR), two last BVs are used. The well-known BD-rate performance measure is used for performance comparison. A negative value in Table 2 indicates an improvement in BD-rate reduction achieved by the corresponding embodiment of the present invention. As shown in Table 2, substantial improvement has been observed particularly for images containing text or graphics materials. The improvement shown is as much as 8.2%. Accordingly, the present invention can substantially improve the performance of coding efficiency for the IntraBC mode.

TABLE 2

|  | Config. I | Config. II | Config. III |
|---|---|---|---|
| RGB, text & graphics with motion, 1080 p | −7.3% | −7.5% | −7.6% |
| RGB, text & graphics with motion, 720 p | −4.2% | −4.4% | −4.5% |
| RGB, mixed content, 1440 p | −2.9% | −3.0% | −3.1% |
| RGB, mixed content, 1080 p | −3.5% | −3.7% | −3.7% |
| RGB, Animation, 720 p | −0.1% | −0.2% | −0.2% |
| RGB, camera captured, 1080 p | 0.0% | 0.0% | 0.0% |
| YUV, text & graphics with motion, 1080 p | −7.7% | −8.2% | −8.2% |
| YUV, text & graphics with motion, 720 p | −4.7% | −4.9% | −5.2% |
| YUV, mixed content, 1440 p | −3.3% | −3.5% | −3.6% |
| YUV, mixed content, 1080 p | −3.7% | −3.9% | −4.0% |
| YUV, Animation, 720 p | −0.1% | −0.2% | −0.3% |
| YUV, camera captured, 1080 p | 0.0% | 0.0% | 0.0% |

Figure 4:
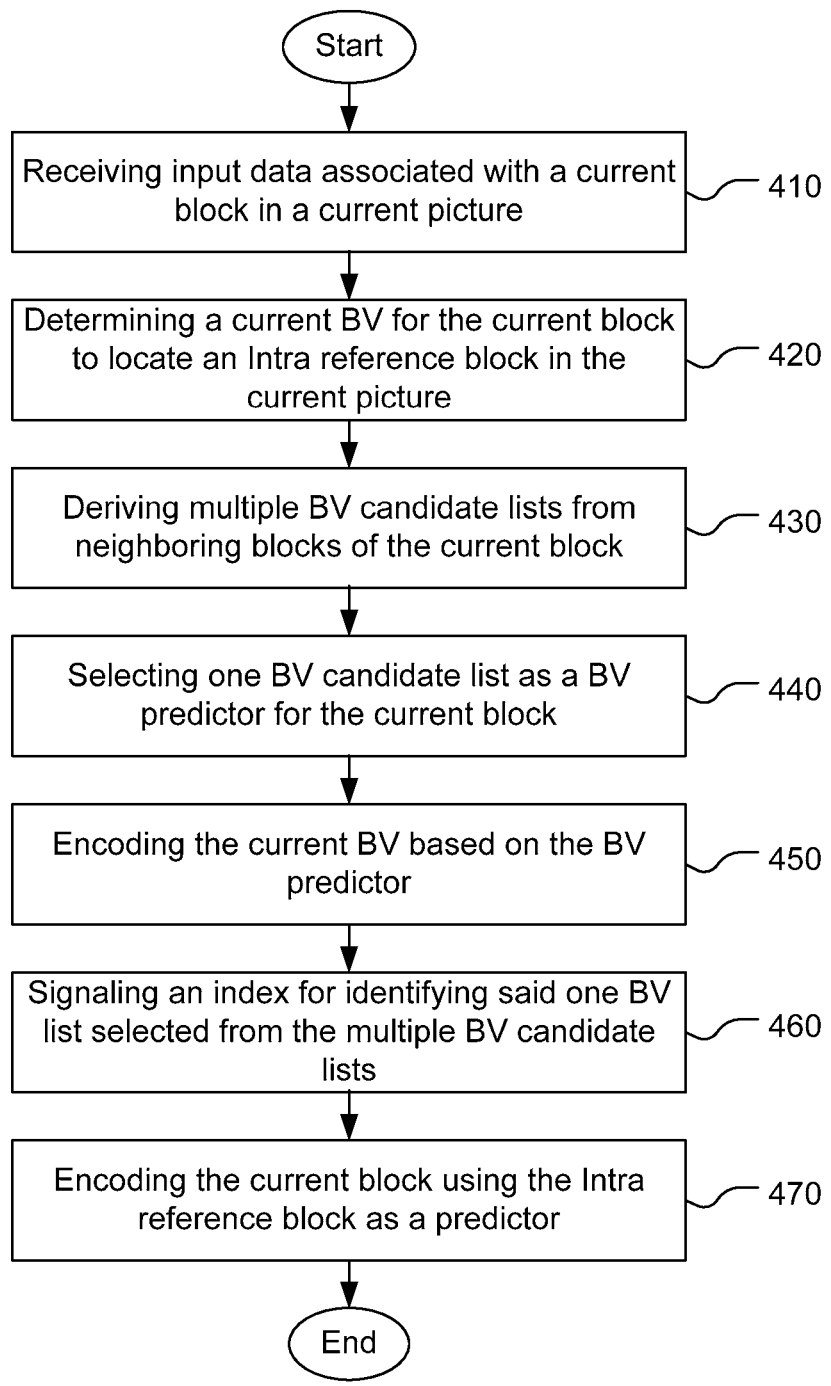
FIG. 4 illustrates an exemplary flowchart for IntraBC (Intra block copy) mode encoding incorporating block vector (BV) prediction according to an embodiment of the present invention.

FIG. 4 illustrates an exemplary flowchart for IntraBC (Intra block copy) mode encoding incorporating block vector (BV) prediction according to an embodiment of the present invention. The system receives input data associated with a current block in a current picture in step 410. The input data may be retrieved from memory (e.g., computer memory, buffer (RAM or DRAM) or other media) or from a processor. A current BV for the current block to locate an Intra reference block in the current picture is determined in step 420. Multiple BV candidate lists are derived from neighboring blocks of the current block in step 430. A BV candidate list is selected as a BV predictor for the current block in step 440. The current BV is encoded based on the BV predictor in step 450. An index for identifying said one BV candidate list selected from the multiple BV candidate lists is signaled in step 460, in which the index corresponds to a 1-bit code to select between two BV candidate lists and corresponds to a 2-bit code to select between three BV candidate lists. The current block is encoded using the Intra reference block as a predictor in step 470.

Figure 5:
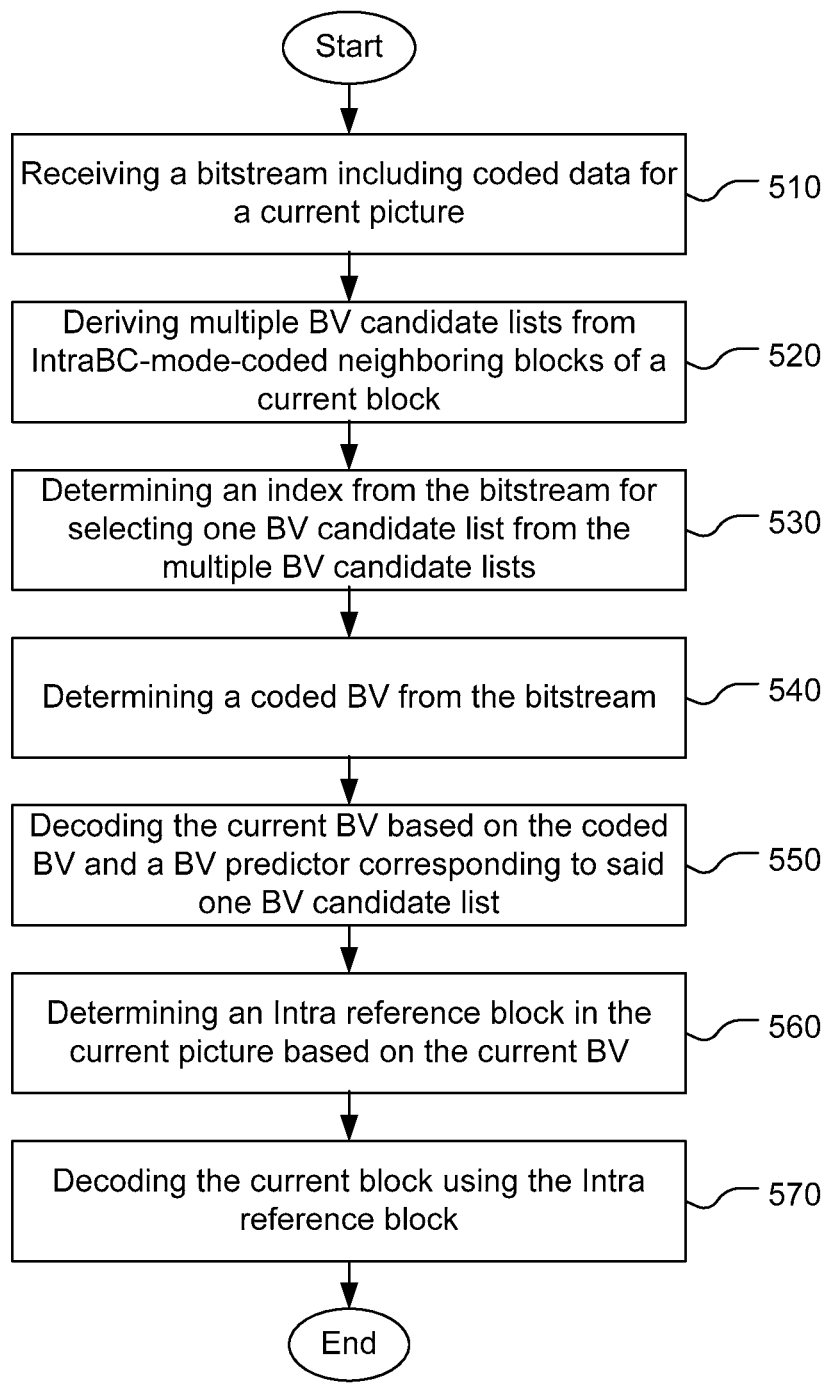
FIG. 5 illustrates an exemplary flowchart for IntraBC (Intra block copy) mode decoding incorporating block vector (BV) prediction according to an embodiment of the present invention.

FIG. 5 illustrates an exemplary flowchart for IntraBC (Intra block copy) mode decoding incorporating block vector (BV) prediction according to an embodiment of the present invention. The system receives a bitstream including coded data for a current picture in step 510. The bitstream may be retrieved from memory (e.g., computer memory, buffer (RAM or DRAM) or other media) or from a processor. Multiple BV candidate lists are derived from IntraBC-mode-coded neighboring blocks of a current block in step 520. An index is determined from the bitstream for selecting one BV candidate list from the multiple BV candidate lists in step 530. A coded BV is determined from the bitstream in step 540. The current BV is decoded based on the coded BV and a BV predictor corresponding to said one BV candidate list in step 550. An Intra reference block in the current picture is determined based on the current BV in step 560. The current block is decoded using the Intra reference block in step 570.

The flowcharts shown above are intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of block vector (BV) prediction for an Intra-block copy mode (IntraBC mode) coded block in a video coding system, the method comprising:
   receiving input data associated with a current block in a current picture;
   determining a current BV for the current block to locate an Intra reference block in the current picture;
   deriving a first BV candidate list and a second BV candidate list from spatially neighboring blocks of the current block, wherein
      the first BV candidate list is generated from one or more first neighboring blocks from the spatially neighboring blocks in selected first positions according to a first position-related priority order,
      the first BV candidate list is filled by a BV of a first IntraBC mode coded block from the one or more first neighboring blocks, the second BV candidate list is generated from one or more second neighboring blocks from the spatially neighboring blocks in selected second positions according to a second position-related priority order, the second BV candidate list is filled by a BV of a first IntraBC mode coded block from the one or more second neighboring blocks, and the one or more first neighboring blocks and the one or more second neighboring blocks are different from one another;

constructing a third BV candidate list according to the first BV candidate list, the second BV candidate list, and a stored BV for a previously coded block from a memory;

selecting one BV candidate from the third BV candidate list as a BV predictor;

encoding the current BV based on the BV predictor;

signaling an index for identifying the selected BV candidate from the third candidate list; and encoding the current block using the Intra reference block as a predictor.

2. The method of claim 1, wherein the one or more first neighboring blocks correspond to a single first spatial neighboring block at a left-bottom (LB) position of the current block, the first position-related priority order includes the LB position only, the one or more second neighboring blocks correspond to a single second spatial neighboring block at an above-right (AR) position of the current block, and the second position-related priority order includes the AR position only.

3. A method of block vector (BV) decoding for an Intra-block copy mode (IntraBC mode) coded block in a video decoder, the method comprising:

receiving a bitstream including coded data for a current picture;

deriving a first BV candidate list and a second BV candidate list from IntraBC-mode-coded, spatially neighboring blocks of a current block, wherein the first BV candidate list is generated from one or more first neighboring blocks from the IntraBC-mode-coded, spatially neighboring blocks in selected first positions according to a first position-related priority order, the first BV candidate list is filled by a BV of a first IntraBC mode coded block from the one or more first neighboring blocks, the second BV candidate list is generated from one or more second neighboring blocks from the IntraBC-mode-coded, spatially neighboring blocks in selected second positions according to a second position-related priority order, the second BV candidate list is filled by a BV of a first IntraBC mode coded block from the one or more second neighboring blocks, and the one or more first neighboring blocks and the one or more second neighboring blocks are different from one another;

constructing a third BV candidate list according to the first BV candidate list, the second BV candidate list, and a stored BV for a previously coded block from a memory;

determining an index from the bitstream for selecting a specific BV candidate from third BV candidate list as a BV predictor;

determining a current BV for the current block based on the BV predictor;

determining an Intra reference block in the current picture based on the current BV; and decoding the current block using the Intra reference block.

4. The method of claim 3, wherein the one or more first neighboring blocks correspond to a single first spatial neighboring block at a left-bottom (LB) position of the current block, the first position-related priority order includes the LB position only, the one or more second neighboring blocks corresponds to a single second spatial neighboring block at an above-right (AR) position of the current block, and the second position-related priority order includes the AR position only.

5. The method of claim 3, wherein the one or more first neighboring blocks correspond to two first spatial neighboring blocks at a left-bottom (LB) position and a lower-left (LL) position of the current block, the first position-related priority order corresponds to the LB position and then the LL position, the one or more second neighboring blocks correspond to three second neighboring blocks at an above-right (AR) position, an upper-right (UR) position, and an upper-left (UL) position of the current block, and the second position-related priority order corresponds to the AR position and then the UR position and then the UL position.

6. The method of claim 3, wherein the first BV candidate list is generated before the second BV candidate list is generated.

7. The method of claim 3, wherein if no available BV candidate is found for the first BV candidate list from the one or more first neighboring blocks in the selected first positions, a first default BV is used for the first BV candidate list, and if no available BV candidate is found for the second BV candidate list from the one or more second neighboring blocks in the selected second positions, a second default BV is used for the second BV candidate list.

8. The method of claim 7, wherein the first default BV or the second default BV is selected from a group including (0, 0), (−2w, 0), (−w, 0), (0, −2w), and (0, −w), wherein w corresponds to a block width of the current block.

9. The method of claim 3, wherein if no available BV candidate is found for the first BV candidate list from the one or more first neighboring blocks in the selected first positions, a first substitute BV corresponding to a first previously IntraBC mode coded block is used for the first BV candidate list, and if no available BV candidate is found for the second BV candidate list from the one or more second neighboring blocks in the selected second positions, a second substitute BV corresponding to a second previously IntraBC mode coded block is used for the second BV candidate list.

10. The method of claim 9, further comprising:

storing the first substitute BV for the first BV candidate list in a first buffer in the memory; and storing the second substitute BV for the second BV candidate list in a second buffer in the memory.

11. The method of claim 10, wherein the first and second buffers corresponding to the first and second BV candidate lists are initialized using two initial BV values corresponding to (−2w, 0) and (−w, 0), wherein w corresponds to a block width of the current block.

12. The method of claim 3, wherein the third BV candidate list further includes a temporal BV candidate list derived from one or more temporal neighboring blocks of the current block.

13. The method of claim 12, wherein the one or more temporal neighboring blocks correspond to one or more co-located blocks selected from a group including a center (CTR) block, an outer bottom-right (BR) block, an upper-left (UL) block, and an inner bottom-right (BR2) block in a co-located picture of the current picture.

14. The method of claim 3, wherein the constructing the third BV candidate list comprises:
putting BV candidates from at least the first BV candidate list, the second BV candidate list, and the stored BV in a fourth BV candidate list, and
pruning the fourth BV candidate list to remove any redundant BV candidate to become the third BV candidate list.

15. The method of claim 14, wherein a size of the third BV candidate list is at most N, wherein N is an integer greater than one.

16. The method of claim 14, wherein the constructing the third BV candidate list comprises:
if a size of the third BV candidate list is less than N, one or more pre-defined BVs are added to the third BV candidate list, wherein N is an integer greater than one.

17. The method of claim 16, wherein the one or more pre-defined BVs correspond to one or more pre-defined values selected from a group including (0, 0), (−2w, 0), (−w, 0), (−1.5w, 0), (0, −2w), (0, −w), and (0, −1.5w), wherein w corresponds to a block width of the current block.

18. The method of claim 1, wherein
if no available BV candidate is found for the first BV candidate list from the one or more first neighboring blocks in the selected first positions, a first default BV is used for the first BV candidate list, and
if no available BV candidate is found for the second BV candidate list from the one or more second neighboring blocks in the selected second positions, a second default BV is used for the second BV candidate list.

19. The method of claim 18, wherein the first default BV or the second default BV is selected from a group including (0, 0), (−2w, 0), (−w, 0), (0, −2w), and (0, −w), wherein w corresponds to a block width of the current block.

20. The method of claim 1, wherein
if no available BV candidate is found for the first BV candidate list from the one or more first neighboring blocks in the selected first positions, a first substitute BV corresponding to a first previously IntraBC mode coded block is used for the first BV candidate list, and
if no available BV candidate is found for the second BV candidate list from the one or more second neighboring blocks in the selected second positions, a second substitute BV corresponding to a second previously IntraBC mode coded block is used for the second BV candidate list.

* * * * *